(12) United States Patent
Nguyen et al.

(10) Patent No.: US 7,006,521 B2
(45) Date of Patent: Feb. 28, 2006

(54) EXTERNAL BUS ARBITRATION TECHNIQUE FOR MULTICORE DSP DEVICE

(75) Inventors: Duy Q. Nguyen, Austin, TX (US); Harland Glenn Hopkins, Missouri City, TX (US); Jay B. Reimer, Houston, TX (US); Yi Luo, Stafford, TX (US); Tai H. Nguyen, Houston, TX (US); Kevin A. McGonagle, Sugarland, TX (US)

(73) Assignee: Texas Instruments Inc., Dallas, TX (US)

( * ) Notice: Subject to any disclaimer, the term of this patent is extended or adjusted under 35 U.S.C. 154(b) by 932 days.

(21) Appl. No.: 10/007,840

(22) Filed: Nov. 8, 2001

(65) Prior Publication Data

US 2002/0057711 A1 May 16, 2002

Related U.S. Application Data

(60) Provisional application No. 60/249,085, filed on Nov. 15, 2000.

(51) Int. Cl.
*H04J 3/02* (2006.01)
(52) U.S. Cl. ............... 370/462; 370/444; 370/447; 370/461; 340/825.5; 710/308; 710/309
(58) Field of Classification Search .............. 370/462, 370/444, 447, 461, 431, 463, 489, 537, 916, 370/422, 423, 351, 421, 400; 340/825, 2.1, 340/825.5; 709/212, 218, 238; 710/29, 710/107, 305, 308, 309, 240, 241, 244, 102, 710/269, 260–262, 103, 18, 268, 266, 48, 710/263, 22, 119, 113, 51, 315; 713/310, 713/300, 601, 500, 320, 322, 323, 600, 324; 711/151, 147, 148, 153, 130
See application file for complete search history.

(56) References Cited

U.S. PATENT DOCUMENTS

| | | | | |
|---|---|---|---|---|
| 5,611,075 A | * | 3/1997 | Garde | 711/153 |
| 5,619,720 A | * | 4/1997 | Garde et al. | 712/38 |
| 5,684,997 A | * | 11/1997 | Kau et al. | 710/260 |

(Continued)

OTHER PUBLICATIONS

Texas Instruments Incorporated, TMS320VC5421 Fixed-Point Digital Signal Processor—Data Manual, Dec., 1999, pp. 34-35.*

(Continued)

*Primary Examiner*—Wellington Chin
*Assistant Examiner*—Jamal A. Fox
(74) *Attorney, Agent, or Firm*—Robert D. Marshall, Jr.; W. James Brady, III; Frederick J. Telecky, Jr.

(57) ABSTRACT

A digital signal processing system includes multiple processor subsystems, an external input/output port (XPORT), and an XPORT arbiter. The processor subsystems each include a processor core and a DMA controller. The XPORT arbiter arbitrates between the processor cores and between the DMA controllers, and further arbitrates between processor control or DMA control of the XPORT. Upon a request signal from a DMA controller, the XPORT arbiter asserts a hold signal to the processor cores. The processor cores respond by asserting a hold acknowledge signal. A processor core will delay the hold acknowledge signal until through with the XPORT. The arbiter, then asserts a grant signal to the DMA controller requesting access. The arbiter may assert a grant signal to a processor core requesting access. However, the processor core's access will be stalled as long as the hold signal is asserted.

18 Claims, 2 Drawing Sheets

U.S. PATENT DOCUMENTS

| | | | | |
|---|---|---|---|---|
| 5,710,911 A | * | 1/1998 | Walsh et al. | 713/500 |
| 5,717,440 A | * | 2/1998 | Katsura et al. | 345/558 |
| 5,721,933 A | * | 2/1998 | Walsh et al. | 713/300 |
| 5,727,221 A | * | 3/1998 | Walsh et al. | 713/310 |
| 5,729,720 A | * | 3/1998 | Kau et al. | 713/500 |
| 5,734,919 A | * | 3/1998 | Walsh et al. | 713/300 |
| 5,754,436 A | * | 5/1998 | Walsh et al. | 713/300 |
| 5,771,373 A | * | 6/1998 | Kau et al. | 713/500 |
| 5,781,780 A | * | 7/1998 | Walsh et al. | 713/300 |
| 5,784,291 A | * | 7/1998 | Chen et al. | 716/10 |
| 5,822,550 A | * | 10/1998 | Milhaupt et al. | 710/315 |
| 5,842,005 A | * | 11/1998 | Walsh et al. | 713/500 |
| 5,845,132 A | * | 12/1998 | Walsh et al. | 710/260 |
| 5,848,253 A | * | 12/1998 | Walsh et al. | 710/308 |
| 5,852,370 A | * | 12/1998 | Ko | 326/81 |
| 5,864,702 A | * | 1/1999 | Walsh et al. | 713/320 |
| 5,867,717 A | * | 2/1999 | Milhaupt et al. | 713/323 |
| 5,872,983 A | * | 2/1999 | Walsh et al. | 713/300 |
| 5,875,312 A | * | 2/1999 | Walsh et al. | 710/303 |
| 5,943,507 A | * | 8/1999 | Cornish et al. | 710/48 |
| 5,987,244 A | * | 11/1999 | Kau et al. | 713/500 |
| 6,112,273 A | * | 8/2000 | Kau et al. | 710/260 |
| 6,421,754 B1 | * | 7/2002 | Kau et al. | 710/261 |
| 6,429,871 B1 | * | 8/2002 | Katsura et al. | 345/501 |
| 6,781,590 B1 | * | 8/2004 | Katsura et al. | 345/538 |
| 2003/0001850 A1 | * | 1/2003 | Katsura et al. | 345/503 |

OTHER PUBLICATIONS

Winderweedle, Bill; *TMS320VC5420 to TMS320VC5421 DSP Migration,* Dec., 1999, whole document.

* cited by examiner

EXTERNAL BUS ARBITRATION TECHNIQUE FOR MULTICORE DSP DEVICE

This application claims priority under 35 USC §119(e)(1) of Provisional Application No. 60/249,085, filed Nov. 15, 2000.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention generally relates to digital signal processors. More particularly, the invention relates to external buses for digital signal processors. Still more particularly, the invention relates to arbitration for control of an external bus between multiple processor cores and direct memory access (DMA) controllers.

Microprocessors generally include a variety of logic circuits fabricated on a single semiconductor chip. Such logic circuits typically include a processor core, memory, and numerous other support components. Some microprocessors, such as digital signal processors (DSPs) provided by Texas Instruments, may include multiple processor subsystems each having its own processor core. Each processor subsystem includes memory and other support components for the associated processor core.

DSPs are generally sought for computationally intensive tasks because they have hardware specially designed for high performance computing. The processor subsystems which may be found on multi-core DSPs often have dedicated buses. For example, a processor subsystem may have a dedicated instruction bus that the processor core uses to retrieve program instructions from memory, a dedicated data bus that the processor core uses to retrieve data from memory, and a dedicated external input/output bus distinct from the instruction and data that the processor core uses for external communications.

The processor subsystems further include a dedicated direct memory access (DMA) memory bus distinct from the aforementioned buses that a DMA controller uses to move data in and out of the memory without any intervention from the processor core. The DMA controller also controls a dedicated external I/O bus. The external I/O buses of the processor core and the DMA controller are coupled to an external port that is shared with the other processor subsystems. The external port is a limited resource that the DMA controllers and the processor cores must share, hence it would be desirable to have an efficient arbitration method for determining which component should obtain control of the external port.

BRIEF SUMMARY OF THE INVENTION

Accordingly, the present invention contemplates a digital signal processing system that includes multiple processor subsystems, an external input/output port (XPORT), and an XPORT arbiter. The processor subsystems each include a processor core and a DMA controller, both of which may require access to the XPORT. The XPORT arbiter grants access by separately arbitrating between the processor cores and between the DMA controllers, and further arbitrating between processor control or DMA control of the XPORT. Upon receiving a request signal from a DMA controller, the XPORT arbiter asserts a hold signal to each of the processor cores. The processor cores respond to the hold signal by asserting a hold acknowledge signal. Note that if a processor core is currently using the XPORT, the processor core will delay assertion of the hold acknowledge signal until it is through with the XPORT. The arbiter, after receiving assertions of each of the hold acknowledge signals, then asserts a grant signal to the DMA controller requesting access. If both DMA controllers request access, only one at a time is provided with a grant signal assertion. Independently of the DMA controller arbitration, the arbiter may assert a grant signal to a processor core requesting access. However, the processor core's access will be stalled as long as the hold signal is asserted. Once the hold signal becomes deasserted, the selected processor core may proceed with its access of the XPORT.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the present invention is discussed below in the context of a multi-core, fixed-point, digital signal processor (DSP) chip. This embodiment, however, is not intended to limit the scope of this disclosure to this context, rather, the preferred embodiment may have applicability to any multiple core DSP device having a shared external I/O port.

Figure 1:
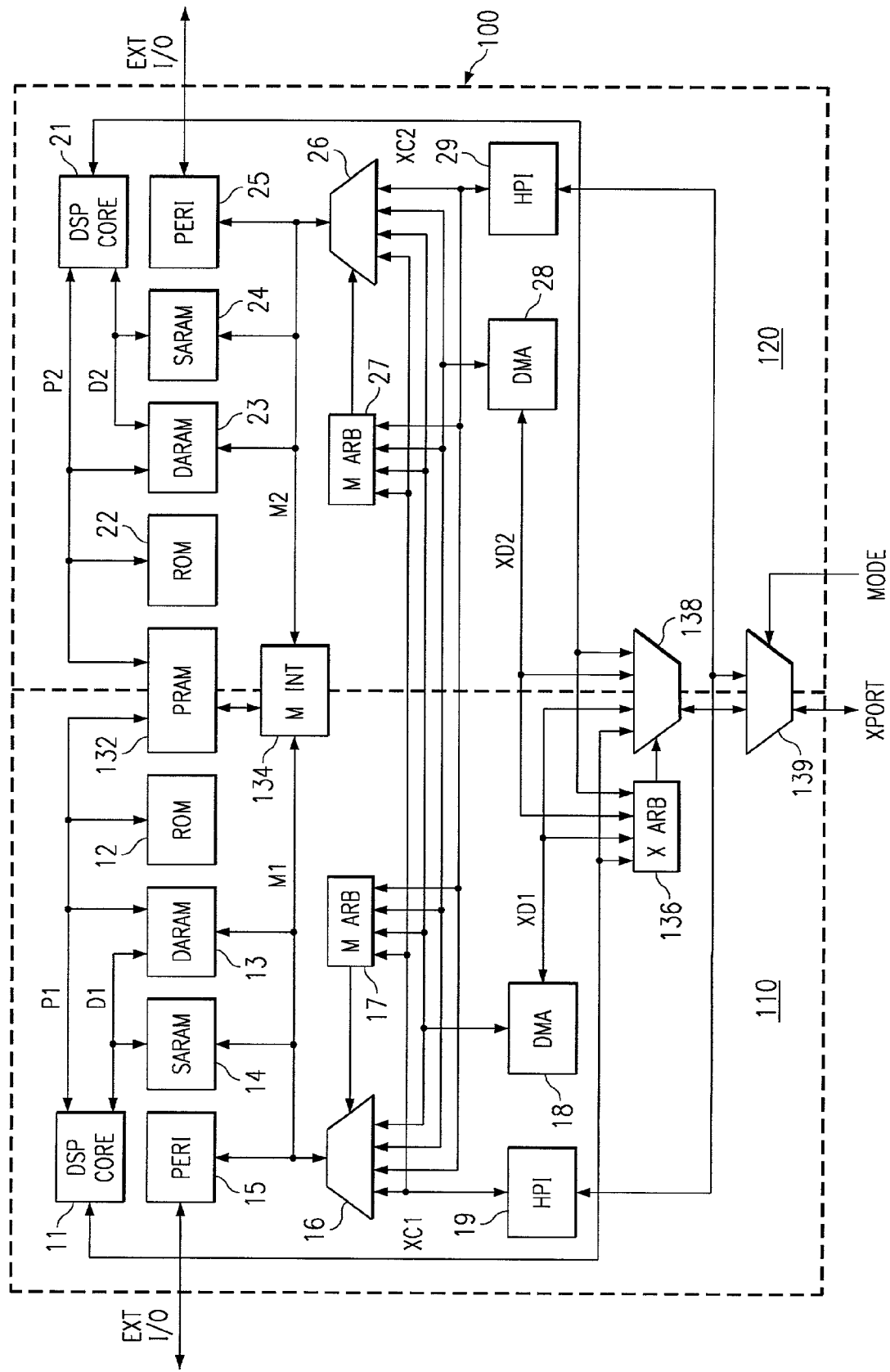
FIG. 1 shows a DSP device having an external port shared by multiple subsystem processor cores and DMA controllers.

Turning now to the figures, FIG. 1 shows a DSP chip 100 that includes multiple DSP subsystems 110, 120, a shared program memory (PRAM) 132, a memory bus interface 134, an external I/O port (XPORT) arbiter 136, an XPORT multiplexer 138, and a host port interface (HPI) multiplexer 139. Each DSP subsystem 110, 120 (generally separated by the dashed line in FIG. 1) preferably includes a DSP core 11, 21, a read-only memory (ROM) 12, 22, a dual-access, random access memory (DARAM) 13, 23, a single-access, random access memory (SARAM) 14, 24, one or more peripheral devices 15, 25, an M-bus multiplexer 16, 26, an M-bus arbiter 17, 27, a DMA controller 18, 28, a host port interface (HPI) 19, 29, and other miscellaneous support circuitry. The subsystems 110, 120, each further include an instruction bus P1, P2, a data bus D1, D2, a memory bus M1, M2, a processor core external I/O bus XC1, XC2, and a DMA controller external I/O bus XD1, XD2.

The shared program memory (PRAM) 132 preferably is reserved for program instructions, and includes 16 blocks of dual-access RAM. Each block comprises 16 kilobytes of storage, although the block size and number of blocks can be varied as desired. Each DSP subsystem 110, 120 can fetch an instruction from any location in the PRAM 132 during each clock cycle. The processor cores 11, 21 concurrently fetch and execute distinct instructions from a single program stored in the PRAM 132. Although the DSP cores may execute the same software program, they do not necessarily execute the same instructions concurrently or necessarily follow the same branches in program flow.

According to the preferred embodiment, the DSP cores 11, 21 are not permitted to write to the PRAM 132. Instead, a host processor (not shown) provides the software to the PRAM 132 via the XPORT, HPI 19, 29 and memory buses M1, M2 as described further below.

The memory bus interface 134 is coupled to PRAM 132 and to the memory buses M1, M2. The memory bus interface 134 provides a set of first-in, first-out (FIFO) buffers that the memory buses M1, M2 can write to and read from. Each FIFO buffer is one way, that is, written to by one memory bus and read by the other. This provides one method of inter-subsystem communication. The memory bus interface 134 also couples both memory buses M1, M2 to PRAM 132. The memory bus interface includes an arbiter which grants one of the memory buses access to PRAM when such accesses are sought. The initial programming of the PRAM and updates of the PRAM are typically performed via the memory buses.

The XPORT arbiter 136 and XPORT multiplexer 138 are coupled to the processor cores 11, 21, and the DMA controllers 18, 28 in each of the subsystems via respective external I/O buses XC1, XC2, XD1, XD2. The processor cores and DMA controllers arbitrate for external access as explained further below, and the arbiter 136 sets the multiplexer 138 in accordance with the arbitration results. The DSP 100 is provided in a semiconductor package that has multiple pins ("leads") to provide external connections for the chip. The package leads used by the XPORT for external access are preferably shared with the host port interface units 19, 29. Accordingly, output from the XPORT multiplexer 138 is coupled to the HPI multiplexer 139, as are the HPI units 19, 29. When the host processor asserts the MODE signal (which is the control signal for the HPI multiplexer 139) the XPORT pins are coupled to the HPI units 19, 29, and the host processor accesses the DSP device 100 as a memory-mapped device. When the host processor de-asserts the MODE signal, the XPORT leads are coupled to the XPORT multiplexer 138, and any external accesses are initiated by the cores 11, 21, or the DMA controllers 18, 28, as explained further below.

The processor cores 11, 21, preferably execute software instructions retrieved via corresponding instruction buses P1, P2, to operate on data retrieved via corresponding data buses D1, D2. Results are returned from the processor cores on the data buses. The processor cores typically include an optimized arithmetic logic unit (ALU) and a control unit. The control unit retrieves data and instructions and decodes the instructions, and the ALU operates on the data as specified by the instructions.

The ROMs 12, 22, are non-volatile memories coupled to the corresponding instruction buses P1, P2. The ROMs preferably store boot-up software for initializing the subsystems. The DARAM 13, 23 preferably includes four memory blocks, each of which support two memory accesses per clock cycle. The DARAMs 13, 23 are intended primarily for data storage, but may be used to store program instructions as well. Accordingly, they are coupled to both the corresponding instruction buses P1, P2, and to the corresponding data buses D1, D2. A register (not shown) in the DSP core 11, 21 determines whether the DARAM 13, 23 is mapped into program memory space or data memory space. The SARAMs 14, 24, preferably also include four memory blocks, each of which support one memory access per clock cycle. Each SARAM preferably is reserved for data storage, and accordingly is coupled to the corresponding data bus D1, D2.

Referring still to FIG. 1, instruction buses P1, P2, couple together the corresponding processor core 11, 21, the local DARAM 13, 23, the local ROM 12, 22, and the shared PRAM 132. Data buses D1, D2, couple together the corresponding processor core 11, 21, the local DARAM 13, 23, and the local SARAM 14, 24. Memory buses M1, M2 couple the memory bus multiplexer 16, 26, with each of the volatile memory devices 13, 14, 23, 24, 132, in the corresponding subsystem. The memory buses also couple to peripheral devices 15, 25.

Peripheral devices 15, 25 preferably each include one or more multi-channel, serial interfaces. The multi-channel serial interfaces provide high-speed, full-duplex, double-buffered serial communications. The configuration of these ports is preferably programmable by the associated processor core to allow direct interfacing with existing serial protocols. Each serial interface 15, 25 preferably supports multi-channel transmit and receive of up to 128 channels. The multi-channel serial ports perform time division multiplexing and de-multiplexing when multiple channels are enabled. Each data frame that is sent or received represents a time-division multiplexed (TDM) data stream, so that the content of one channel is interleaved with the contents of the other channels.

Memory bus multiplexers 16, 26 and memory bus arbiters 17, 27 are each coupled to all DMA controllers 18, 28, and HPI units 19, 29. Focusing for the moment on multiplexer 16, local DMA controller 18, local HPI unit 19, remote DMA controller 28, and remote HPI unit 29 can each control memory bus M1 to access peripherals 15, SARAM 14, DARAM 13, and PRAM 132. Arbitration among the local DMA controller, the local HPI unit, and the remote subsystem for access to memory bus M1 is performed by arbiter 17, which then sets the memory bus multiplexer 16 in accordance with the arbitration winner. Multiplexer 26 and arbiter 27 operate similarly for accesses via memory bus M2.

Each DMA controller 18, 28 moves data and instructions to and from local peripherals and data storage devices, and to shared PRAM 132, via the corresponding memory bus M1, M2. Each DMA controller 18, 28 can also move data to and from remote peripherals and data storage devices via the remote memory bus. Finally, each DMA controller can move data to and from external sources via an external I/O bus XD1, XD2, and the XPORT. Although the transfers may be initiated in different ways, including initiation by the processor core, the transfers are thereafter performed "in the background", i.e., without active monitoring and control by the processor core. Each DMA controller preferably provides multiple "channels" for the independent, concurrent management of multiple block transfers. DMA transfers are accomplished by first reading the data into memory internal to the DMA controller, and then writing the data from the DMA controller memory to the desired destination. When processor core memory accesses to internal memory conflict with DMA controller accesses, the DMA controller accesses are preferably given higher priority.

The HPI units 19, 29 allow an external host processor to access all internal memory via the memory buses M1, M2. To keep the overall system design simple, the host processor interfaces 19, 29 are designed to mimic a memory interface. That is, the host processor can "view" the contents of any memory location internal to the DSP device 100 and many of the processor core registers by sending an address to the HPI units 19, 29 indicating the desired location. One of the HPI units 19, 29 then retrieves the desired information and provides the information as data in the same way that a memory device would. The HPI units 19, 29 can similarly store data in the desired location. The software to be executed by the processor cores may be provided by the host processor in this manner. That is, the host processor may write the software to shared PRAM 132 via the HPI 19, 29. The HPI units 19, 29 preferably act as a slave device to the host processor, but may generate a signal to the host processor to stall the host processor during an access if the memory buses M1, M2 are busy with other tasks.

Figure 2:
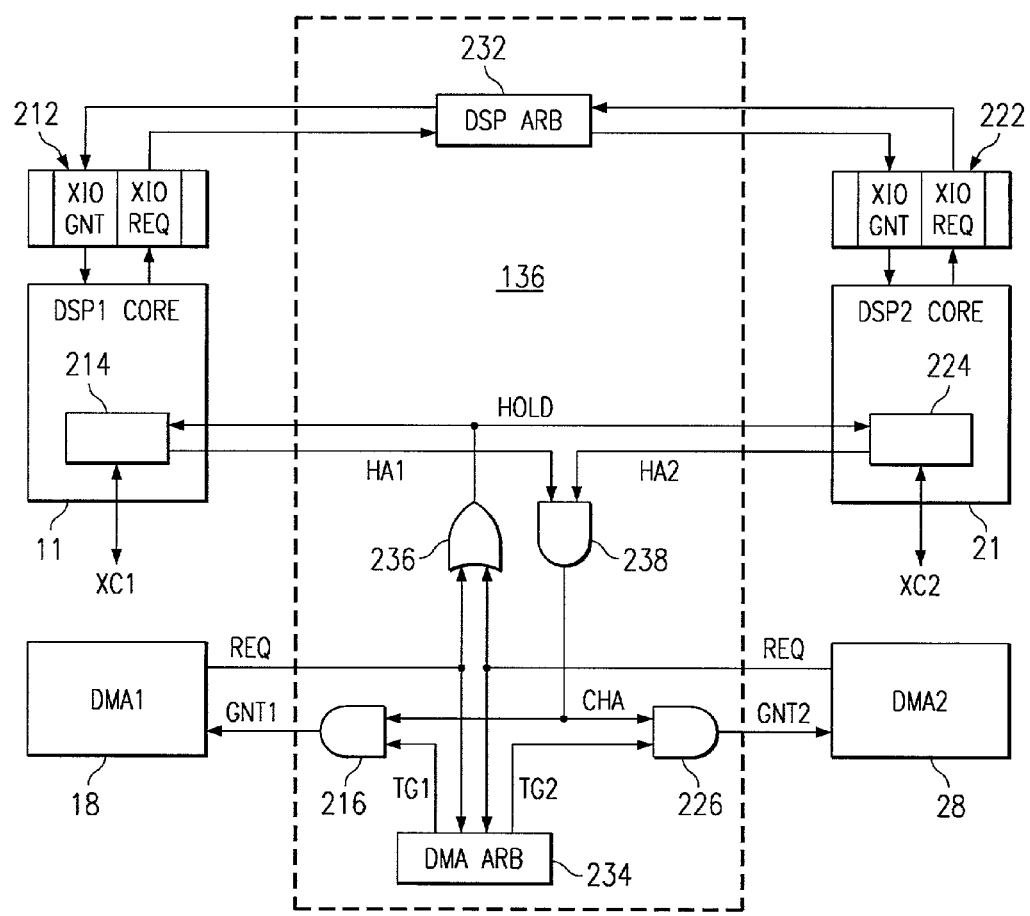
FIG. 2 shows one embodiment of an external port arbiter.

As mentioned previously, the processor cores and DMA controllers arbitrate with the XPORT arbiter 136 for access to the XPORT. As shown in FIG. 2, the XPORT arbiter includes a processor core arbiter 232, a DMA controller arbiter 234, and logic gates 216, 226, 236, and 238. Also shown in FIG. 2 are general purpose I/O (GPIO) registers 212 and 222, and external I/O bus interface logic 214 and 224. Registers 212, 222, may each include bits used for communication with (and configuration of) support circuitry. One of the bits in each of these registers is reserved as an external I/O request (XIO REQ) signal that can be asserted or de-asserted by the processor core. The XIO REQ signals are coupled to the processor core arbiter 232. Another of the bits in each of the registers is reserved as an external I/O grant (XIO GNT) signal that can be asserted or de-asserted by the arbiter 232.

The processor cores 11, 21 preferably assert the XIO REQ signal when they desire control of the XPORT. The cores then poll the XIO GNT signal until it is asserted, at which time they may begin using the XPORT, subject to the assertion of a HOLD signal as described below. Once the processor cores are through using the XPORT, they preferably de-assert the XIO REQ signal. Consequently, when there is no conflict, the arbiter 232 asserts the appropriate XIO GNT signal in response to the assertion of an XIO REQ signal. If both XIO REQ signals are asserted in the same clock cycle, the XIO GNT signal is asserted in register 212. In any event, the assertion of XIO GNT signal is maintained until the corresponding XIO REQ signal is de-asserted. The assertion and de-assertion of the XIO REQ signals is performed by software executing on the processor core, so the processor core arbitration scheme is primarily controlled by software and can be customized by the programmer.

The external I/O bus interface logic 214, 224 of the processor cores receives a HOLD signal from the XPORT arbiter 136. If the interface logic is active, i.e., external I/O transactions are being performed, the interface logic ignores the HOLD signal. The processor core can continue operating via the XPORT as long as the host processor does not alter the setting of the HPI multiplexer 139 (see FIG. 1). Once the processor core pauses in the external I/O activity, or if there is no current external I/O activity, the interface logic replies to an assertion of the HOLD signal by asserting a hold acknowledge (HA) signal. Thereafter, as long as the HOLD signal is asserted, any interface logic activity is suspended, and any processor core attempts to access the XPORT are stalled. The interface logic preferably generates the HA signal using hard-wired logic.

The DMA controllers 18, 28 preferably assert request (REQ) signals to the arbiter 136 when they desire access to the XPORT. The HOLD signal is generated from the REQ signals by logic gate 236. Logic gate 236 preferably comprises a logical OR gate. The HOLD signal is asserted if either or both of the request signals are asserted. The DMA arbiter 234 also receives both request signals, and in response it asserts a tentative grant signal TG1, TG2 for one of the DMA controllers. The tentative grant signals TG1, TG2, for controllers 18, 28 are gated through logic gates 216, 226, respectively. Gates 216, 226 preferably comprise logical AND gates. Logic gates 216, 226 respectively generate grant signals GNT1, GNT2 for controllers 18, 28 from the tentative grant signals TG1, TG2, and from a combined acknowledgement signal CHA. Logic gates 216, 226, assert their respective grant signals GNT1, GNT2 when both the tentative grant signal (TG1, TG2) and the combined acknowledgement signal CHA are asserted. The combined acknowledgement signal CHA is generated by logic gate 238, which asserts the combined acknowledge signal CHA only when hold acknowledgement signals HA1, HA2 from both processor cores are asserted. Logic gate 238 preferably comprises a logical AND gate.

Consequently, XPORT arbiter 136 asserts a grant signal to the requesting DMA controller 18, 28 only if both processor cores acknowledge that they are currently not using the XPORT. If both DMA controllers simultaneously request access, the DMA arbiter 234 resolves the conflict on a rotating priority basis, asserting a grant signal only to the controller currently having priority. That is, if DMA controller 18 wins an access conflict with DMA controller 28 in a given clock cycle, DMA controller 28 will be given priority the next time a conflict occurs between the DMA controllers. When a DMA controller 18, 28 receives a grant signal, it has control of the XPORT. The DMA controller de-asserts the request signal when it is through using the XPORT.

The DMA arbiter 234 may alternatively assign predetermined and constant priorities to the DMA controllers, so that a conflict is always resolved the same way. If both a DMA controller and a processor core request access simultaneously, the DMA controllers have priority, i.e., the DMA controllers will have control of the XPORT, and the processor core will have to wait until the DMA controllers release control of the XPORT.

The DMA controllers 18, 28 are designed to pause between XPORT accesses, preferably for at least one clock cycle. This allows the DMA controllers to interleave their XPORT accesses if both are actively performing external I/O. If only one DMA controller is active, the pause also allows either of the processor cores to seize control of the XPORT.

In the embodiment of FIGS. 1 and 2, the DSP device 100 includes only two DSP subsystems 110, 120. As one skilled in the art will appreciate, there may be more than two DSP subsystems, each having a corresponding processor core and DMA controller. Referring to FIG. 2, the XPORT arbiter may assert a HOLD signal to all of the processor cores and allow a DMA controller to access the XPORT only after all processor cores have responded with hold acknowledgements.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A digital signal processing system that comprises:
   a plurality of processor subsystems that each include:
      a processor core; and
      a direct memory access ("DMA") controller;
   a external input/output port ("XPORT") coupled to each of the processor cores and each of the DMA controllers via a multiplexer; and
   an XPORT arbiter coupled to the multiplexer and configured to grant XPORT access to a selected one of the processor cores and DMA controllers.

2. The system of claim 1, wherein the multiplexer, XPORT arbiter, and the plurality of processor subsystems are fabricated on a single chip.

3. The system of claim 1, wherein the XPORT arbiter is configured to provide a HOLD signal to the processor cores, wherein the HOLD signal is asserted in response to the assertion of one or more request signals from the DMA controllers.

4. The system of claim 3, wherein the XPORT arbiter includes a logic gate configured to assert the HOLD signal in response to the assertion of any one of a plurality of request signals, wherein the DMA controllers assert a corresponding one of said request signals to request access to the XPORT.

5. The system of claim 3, wherein the processor cores are each configured to assert a respective HOLD acknowledge signal in response to an assertion of the HOLD signal if the processor core is currently not accessing the XPORT.

6. The system of claim 5, wherein the XPORT arbiter includes a logic gate configured to combine the HOLD acknowledge signals to produce a combined acknowledge signal, wherein the logic gate asserts the combined acknowledge signal only when each of the HOLD acknowledge signals is asserted.

7. The system of claim 6, wherein the XPORT arbiter further includes a DMA arbiter configured to receive the request signals from the DMA controllers and further configured to assert a conditional grant signal for a selected DMA controller in response to the assertion of a request signal.

8. The system of claim 7, wherein the XPORT arbiter further includes a grant signal gate for each DMA controller, wherein each grant signal gate is configured to assert grant signal to a selected DMA controller when both the combined acknowledge signal and the conditional grant signal for the selected DMA controller are asserted.

9. The system of claim 7, wherein the XPORT arbiter further includes a processor core arbiter distinct from the DMA arbiter.

10. The system of claim 9, wherein the processor subsystems each further include a register coupled between the processor core and the processor core arbiter, wherein the register includes a request bit and a grant bit.

11. The system of claim 10, wherein the processor cores execute software including an XPORT arbitration process, wherein the process asserts the request bit to request access to the XPORT, and wherein the process accesses the XPORT only if the grant bit is asserted subsequent to the assertion of the request bit.

12. The system of claim 11, wherein the processor core arbiter asserts a grant bit for a selected processor core in response to the assertion of one or more request bits.

13. A method of providing access to a limited resource in a digital signal processing system, wherein the method comprises:
   receiving one or more request signals from a set of components of two distinct types;
   responsively asserting a grant signal to a selected component of a first type if the one or more request signals are each from components of the first type;
   responsively asserting a hold signal to each component of the first type if the one or more request signals include a request signal from a component of the second type;
   if the one or more request signals include a request signal from a component of the second type:
      receiving assertions of hold acknowledge signals from each of the components of the first type;
      asserting a grant signal to a selected component of the second type after receiving said hold acknowledge assertions; and
   wherein the components of the first type assert each assert a respective hold acknowledge signal in response to assertion of the hold signal, and wherein any component of the first type that is actively accessing the XPORT delays assertion of the hold acknowledge signal until said accessing is completed.

14. The method of claim 13, wherein after asserting their hold acknowledge signals, the components of the first type stall any of their accesses until after the hold signal is de-asserted.

15. The method of claim 13, wherein after asserting the request signal, the components of the first type monitor the grant signal for assertion, wherein the components of the first type access the limited resource after detecting said grant signal assertion, and wherein the components of the first type de-assert the request signal after completing said access.

16. The method of claim 13, wherein the components of the first type are processor cores.

17. The method of claim 13, wherein the components of the second type are DMA controllers.

18. The method of claim 13, wherein the limited resource is an external input/output port that can be used by only one of said components at a time.

* * * * *